US012249194B2

(12) United States Patent
Ash et al.

(10) Patent No.: US 12,249,194 B2
(45) Date of Patent: Mar. 11, 2025

(54) AIRCRAFT USAGE TRACKING SYSTEM AND RELATED METHODS

(71) Applicant: D&J AVIATION, LLC, Apopka, FL (US)

(72) Inventors: Justin Ash, Ocoee, FL (US); David S. Carus, Gotha, FL (US)

(73) Assignee: D&J Aviation, LLC, Apopka, FL (US)

( * ) Notice: Subject to any disclaimer, the term of this patent is extended or adjusted under 35 U.S.C. 154(b) by 203 days.

(21) Appl. No.: 18/127,607

(22) Filed: Mar. 28, 2023

(65) Prior Publication Data

US 2024/0331457 A1 Oct. 3, 2024

(51) Int. Cl.

*G07C 5/02* (2006.01)
*G07C 5/00* (2006.01)
*G07C 7/00* (2006.01)

(52) U.S. Cl.

CPC ............... *G07C 5/02* (2013.01); *G07C 5/008* (2013.01); *G07C 7/00* (2013.01)

(58) Field of Classification Search

CPC . G07C 5/02; G07C 5/008; G07C 7/00; G07C 5/0841; G07C 5/085

See application file for complete search history.

(56) References Cited

U.S. PATENT DOCUMENTS

| | | | | |
|---|---|---|---|---|
| 10,144,510 B1 * | 12/2018 | Vander Lind | ............. | F03D 9/32 |
| 2007/0084971 A1 * | 4/2007 | Miyake | .................. | B64U 30/12<br>244/190 |
| 2017/0341740 A1 * | 11/2017 | Vander Lind | ......... | B64C 31/024 |
| 2017/0341741 A1 * | 11/2017 | Horn | ..................... | B64C 27/615 |

* cited by examiner

*Primary Examiner* — Behrang Badii

(74) *Attorney, Agent, or Firm* — Allen, Dyer, Doppelt + Gilchrist, P.A. Attorneys at Law

(57) ABSTRACT

An aircraft usage tracking system may include a wireless communications network at a given airport location, and an aircraft usage tracking device carried by an aircraft having at least one motor. The aircraft usage tracking device may include wireless communications circuitry and an aircraft operation controller coupled thereto. The aircraft operation controller may determine a motor start operation of the at least one motor when the aircraft is at the given airport location based upon connection to the wireless communications network, and wirelessly communicate motor start operation data associated with the motor start operation. The aircraft operation controller may determine a motor stop operation of the at least one motor, and determine whether the motor stop operation is at the given airport location based upon a reconnection to the wireless communications network, and when so, wirelessly communicate motor stop operation data associated with the motor stop operation.

24 Claims, 9 Drawing Sheets

AIRCRAFT USAGE TRACKING SYSTEM AND RELATED METHODS

FIELD OF THE INVENTION

The present disclosure is directed to the field of aircraft, and more particularly, to the field of aircraft usage tracking and related methods.

BACKGROUND

Aircraft usage may be measured in time of usage of the aircraft. One way of measuring the time of usage of the aircraft, particularly, in general aviation aircraft, may be to measure operational time of the motor(s). Operation of the motors may be measured by cumulative time of the tachometer, for example, for each motor. Another approach to measuring motor operation time, may be using a Hobbs meter.

A Hobbs meter typically displays hours and tenths of an hour, and can typically be activated in any number of ways. For example, a Hobbs meter may measure the time that the electrical system is on. A Hobbs meter may be activated by oil pressure running into a pressure switch, and may therefore be operational to measure time while the engine is running. A Hobbs meter may operate to measure elapsed time using other techniques, for example, using airspeed.

In general aviation, recorded time from the Hobbs meter is usually translated to a pilot's logbook. Moreover, aircraft rental durations may be determined based upon elapsed time on the Hobbs meter. Progress toward a pilot certificate may be recorded in terms of cumulative time recorded on the Hobbs meter. In many cases, it is incumbent upon the renter and/or student to accurately record these usage times within their logbook and for billing purposes of the rental.

SUMMARY

An aircraft usage tracking system may include a wireless communications network at a given airport location. The aircraft usage tracking system may also include an aircraft usage tracking device carried by an aircraft having at least one motor. The aircraft usage tracking device may include wireless communications circuitry, and an aircraft operation controller coupled to the wireless communications circuitry. The aircraft operation controller may be configured to determine a motor start operation of the at least one motor when the aircraft is at the given airport location based upon connection to the wireless communications network, and wirelessly communicate motor start operation data associated with the motor start operation. The aircraft operation controller may also be configured to determine a motor stop operation of the at least one motor, and determine whether the motor stop operation of the at least one motor is at the given airport location based upon a reconnection to the wireless communications network, and when so, wirelessly communicate motor stop operation data associated with the motor stop operation.

The aircraft operation controller may be configured to wirelessly communicate the motor start operation data based upon the motor start operation at the given airport, for example. The aircraft operation controller may be configured to wirelessly communicate the motor stop operation data based upon the motor stop operation being at the given airport location. The aircraft operation controller may be configured to wirelessly communicate the motor stop operation data based upon a disconnection from the wireless communications network between the motor start and stop times, for example.

The aircraft usage tracking system may also include an aircraft usage tracking server. The aircraft operation controller may be configured to wirelessly communicate the motor start and stop operation data to the aircraft usage tracking server.

The aircraft usage tracking server may be configured to determine an aircraft usage duration based upon the motor start and stop operation data, for example. The aircraft usage tracking server may be configured to generate and communicate an invoice to an aircraft user based upon the aircraft usage duration, for example.

The aircraft usage tracking system may further include a user interface device associated with a given user. The aircraft operation controller may be configured to determine whether the aircraft is at the given airport location based upon connection of the user interface device to the wireless communications network via, and upon the motor stop operation, wirelessly communicate the motor stop operation data to the aircraft usage tracking server to mark the stop time via the user interface device, for example.

The motor start operation data may include at least one of a motor start time, a motor tachometer start time, a motor Hobbs meter start time. The motor stop operation data may include at least one of a motor stop time, a motor tachometer stop time, a motor Hobbs meter stop time.

The aircraft may include an electrical bus coupled to the aircraft operation controller. The aircraft operation controller may be configured to determine the motor start operation based upon a voltage on the electrical bus and determine the motor stop operation based upon removal of the voltage on the electrical bus, for example.

The at least one motor may include at least one combustion engine. The aircraft may include at least one fluid pressure sensor associated with the at least one combustion engine and coupled to the aircraft operation controller, and the aircraft operation controller may be configured to determine the motor start operation based upon a sensed pressure from the fluid pressure sensor, for example.

The aircraft usage tracking device may also include a geographic position determining device coupled to the aircraft operation controller and configured to determine a geographic position of the aircraft. The aircraft operation controller may be configured to determine whether the motor stop operation of the at least one motor is at the given airport location based upon the geographic position of the aircraft at the given airport location, for example.

A method aspect is directed to a method of tracking aircraft usage for an aircraft having at least one motor. The method may include using an aircraft usage tracking device to determine a motor start operation of the at least one motor when the aircraft is at a given airport location based upon connection to a wireless communications network at the given airport location. The method may also include using the aircraft usage tracking device to wirelessly communicate motor start operation data associated with the motor start operation, and determine a motor start operation of the at least one motor. The method may also include using the aircraft usage tracking device to determine whether the motor stop operation of the at least one motor is at the given airport location based upon a reconnection to a wireless communications network at the given airport location, and when so, wirelessly communicate motor stop operation data associated with the motor stop operation.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notations are used to refer to like elements in different embodiments.

Figure 1:
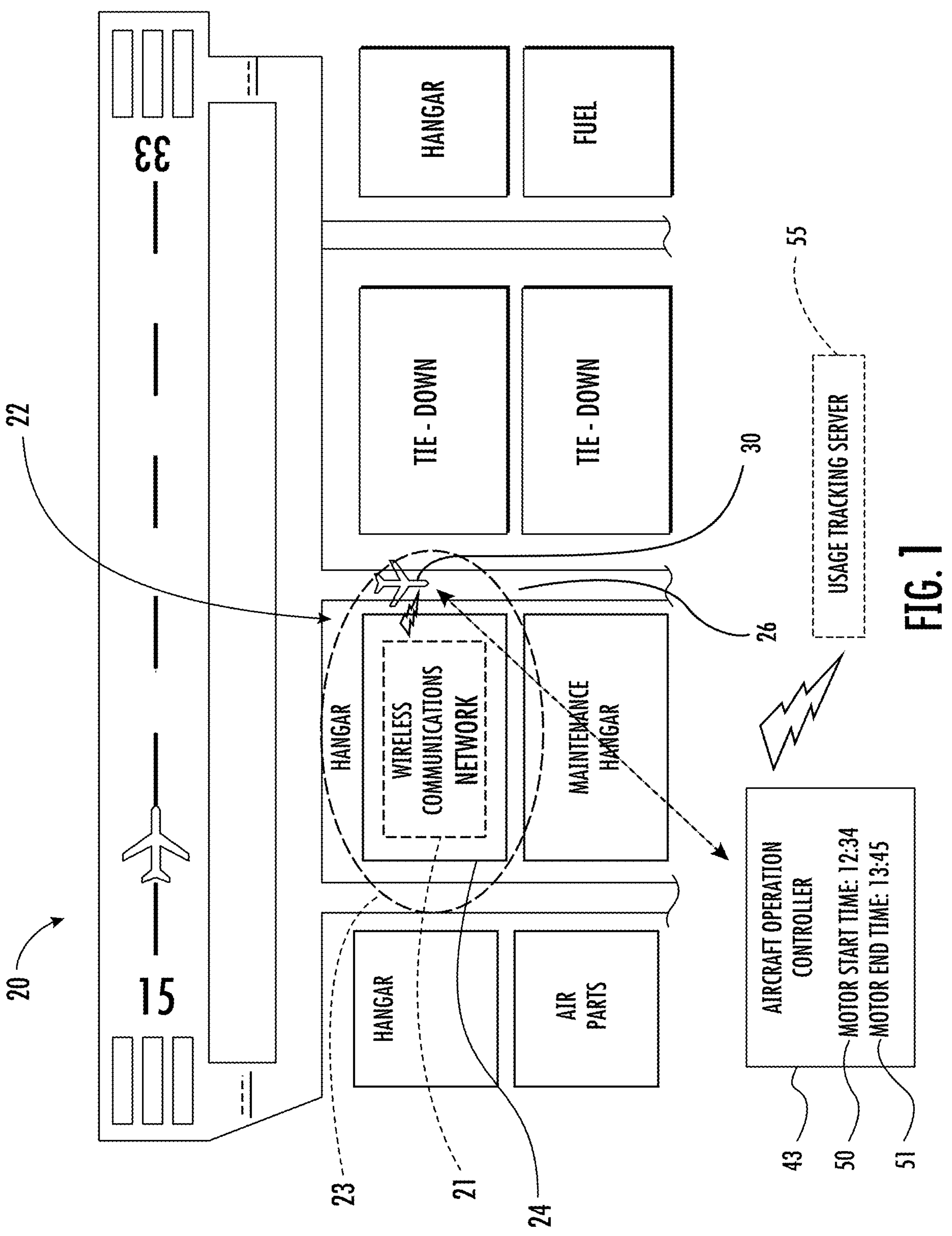
FIG. 1 is schematic diagram of an aircraft usage tracking system in accordance with an embodiment.
Figure 2:
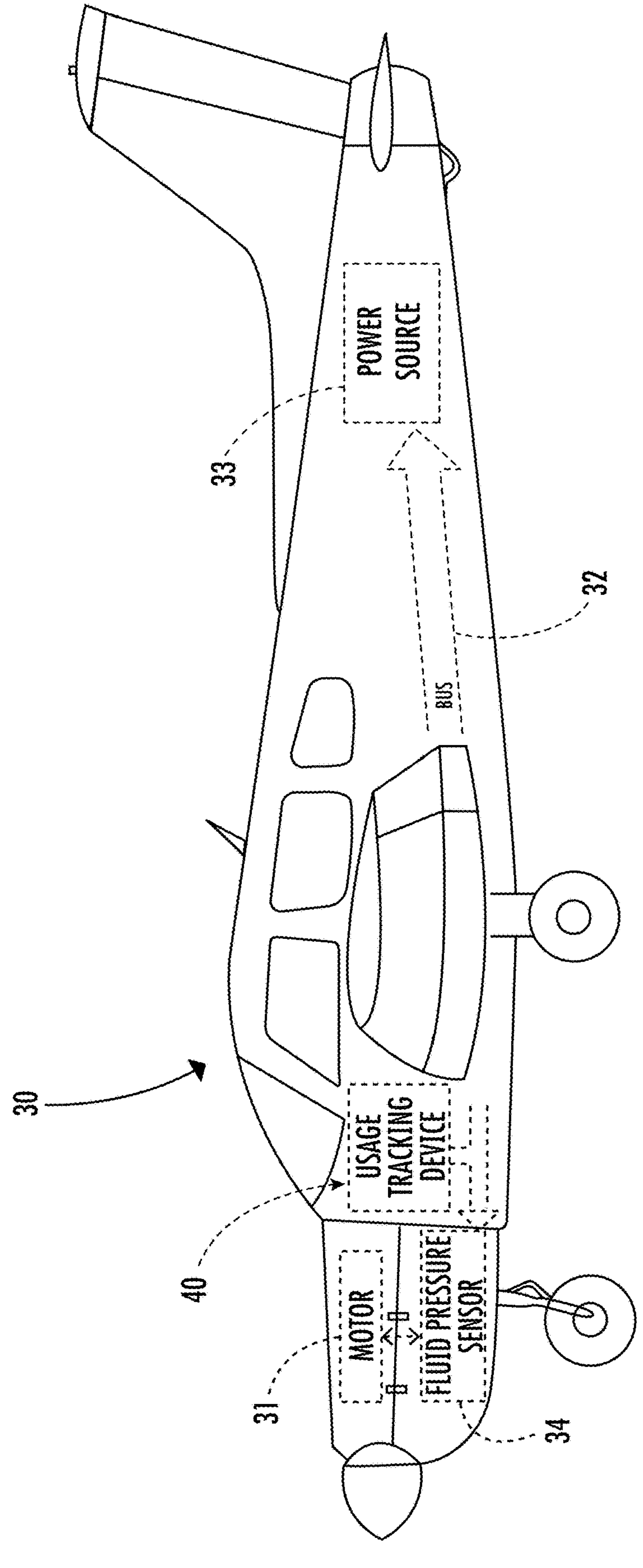
FIG. 2 is a schematic diagram of an aircraft including an aircraft usage tracking device of the system of FIG. 1.
Figure 3:
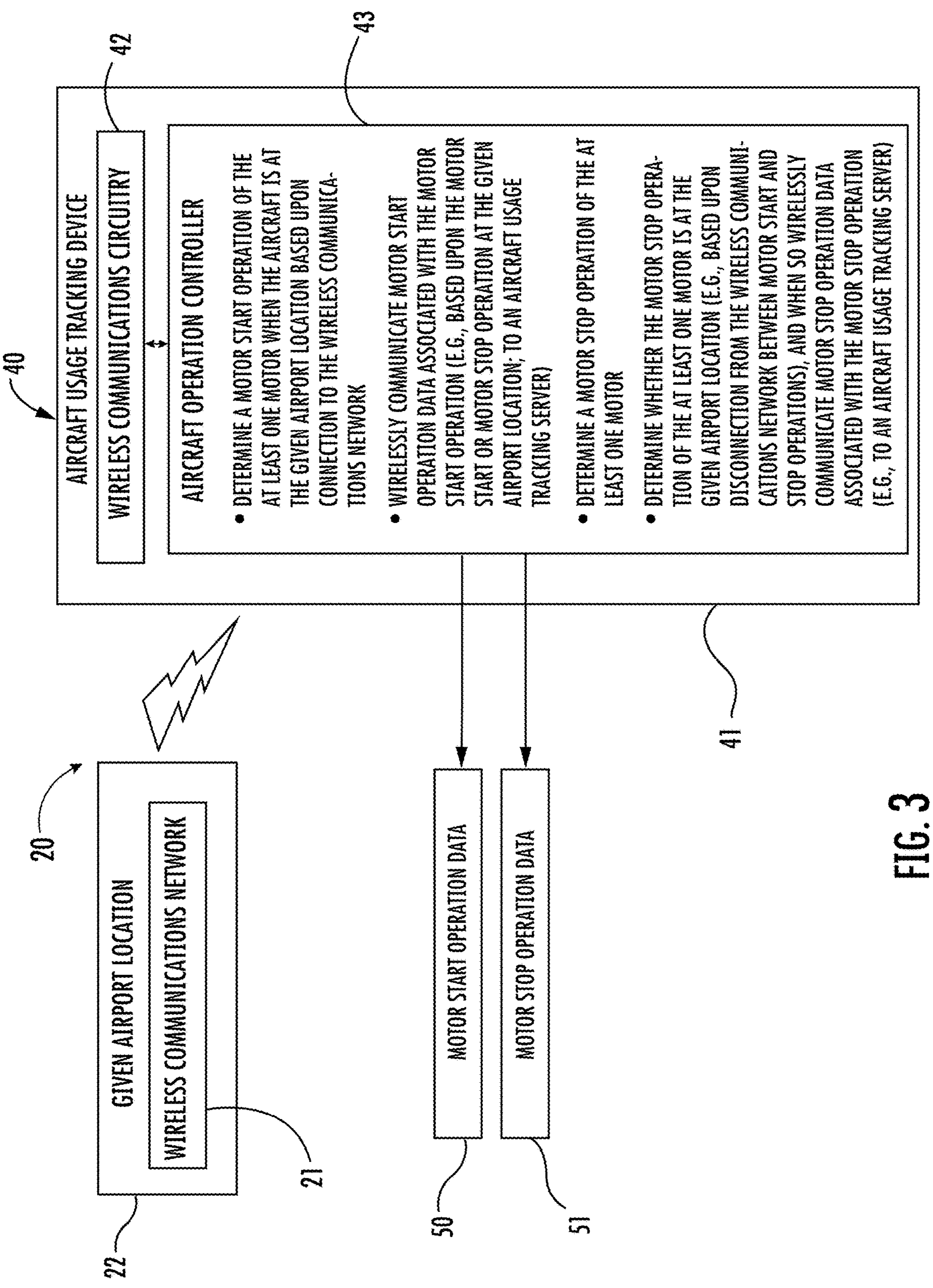
FIG. 3 is schematic block diagram of a portion of the aircraft usage tracking system of FIG. 1.

Referring initially to FIGS. 1-3, an aircraft usage tracking system 20 includes a wireless communications network 21 at a given airport location 22. The given airport location 22 may be any one or more of a given hangar 24, adjacent taxiway 26, tie-down area, apron, gate, or other area of the airport within a threshold area (e.g., from among other airport areas 27 including hangars, buildings, and/or businesses on the airport property). The given airport location 22 is typically less than an entire area of the airport 25.

The wireless communications network 21 has a communication range 23 within the given airport location 22. In other words, the communication range 23 may encompass the given airport location 22, but not other parts of the airport 25. For example, the wireless communications network 21 may be a WiFi network that has a network identifier (e.g., service set identifier (SSID), device address, network address, subnet, and/or sub mask) associated therewith. It is generally desirable that the communication range 23 not extend beyond the desired range for reasons as will be described in further detail below and as will be appreciated by those skilled in the art. Access to the wireless communications network 21 may be provided to a device based upon the network identifier and credential, such as, for example, a password.

The aircraft usage tracking system 20 also includes an aircraft usage tracking device 40 carried by an aircraft 30. The aircraft 30 has a motor 31, and more particularly, a combustion engine. The motor 31 may be an electric motor, and/or the aircraft 30 may have more than one motor. The aircraft 30 also includes an electrical bus 32 coupled to a power source 33. Power on the electrical bus 32 may be selectively controlled, for example, by one or more mechanical switches. More particularly, power may be provided to components on the electrical bus 32 upon activating any of the mechanical switches, for example, avionics, lighting, and/or other electrically powered devices on the aircraft 30.

In some embodiments, the aircraft 30 may include a fluid pressure sensor 34, for example, where the motor 31 is in the form of a combustion engine, an engine oil pressure sensor. As will be appreciated by those skilled in the art, the oil pressure sensor 34 detects oil pressure when the motor 31 is operating and outputs a voltage, which is converted to an output in terms of pressure. The voltage output may also be used to drive or activate other devices, as will be described in further detail below.

The aircraft usage tracking device 40 includes a housing 41, wireless communications circuitry 42 carried by the housing, and an aircraft operation controller 43 coupled to the wireless communications circuitry. The wireless communications circuitry 42 may include short-range wireless communications circuitry, for example, WiFi and/or, Bluetooth communications circuitry. The wireless communications circuitry 42 may communicate via the wireless communications network 21. The aircraft usage tracking device 40 is also coupled to the electrical bus 32 and operates when power from the power source 33 is applied to the electrical bus.

Figure 4A:
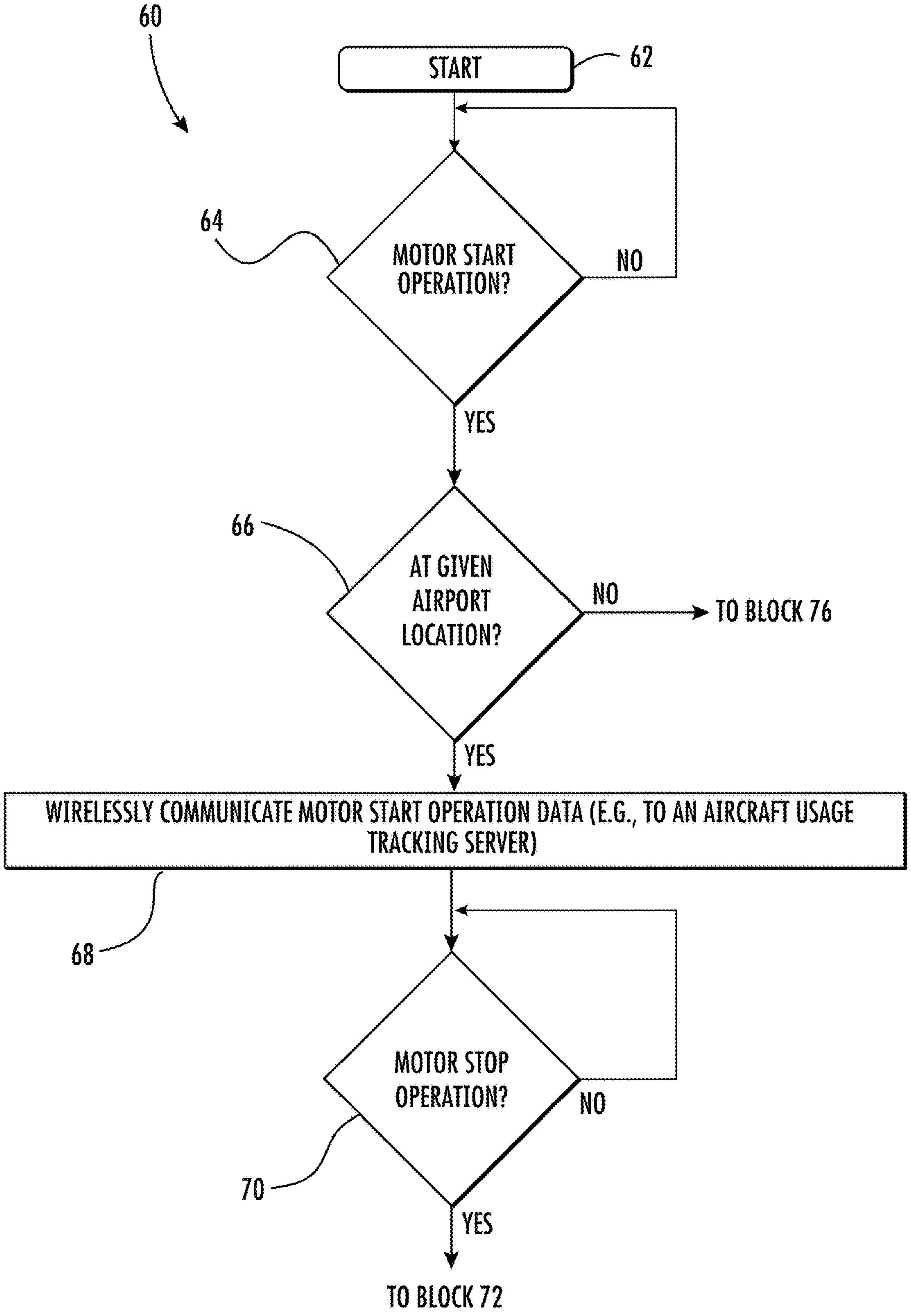
FIGS. 4A and 4B are flow diagrams illustrating operation of the aircraft usage tracking system of FIG. 1.
Figure 4B:
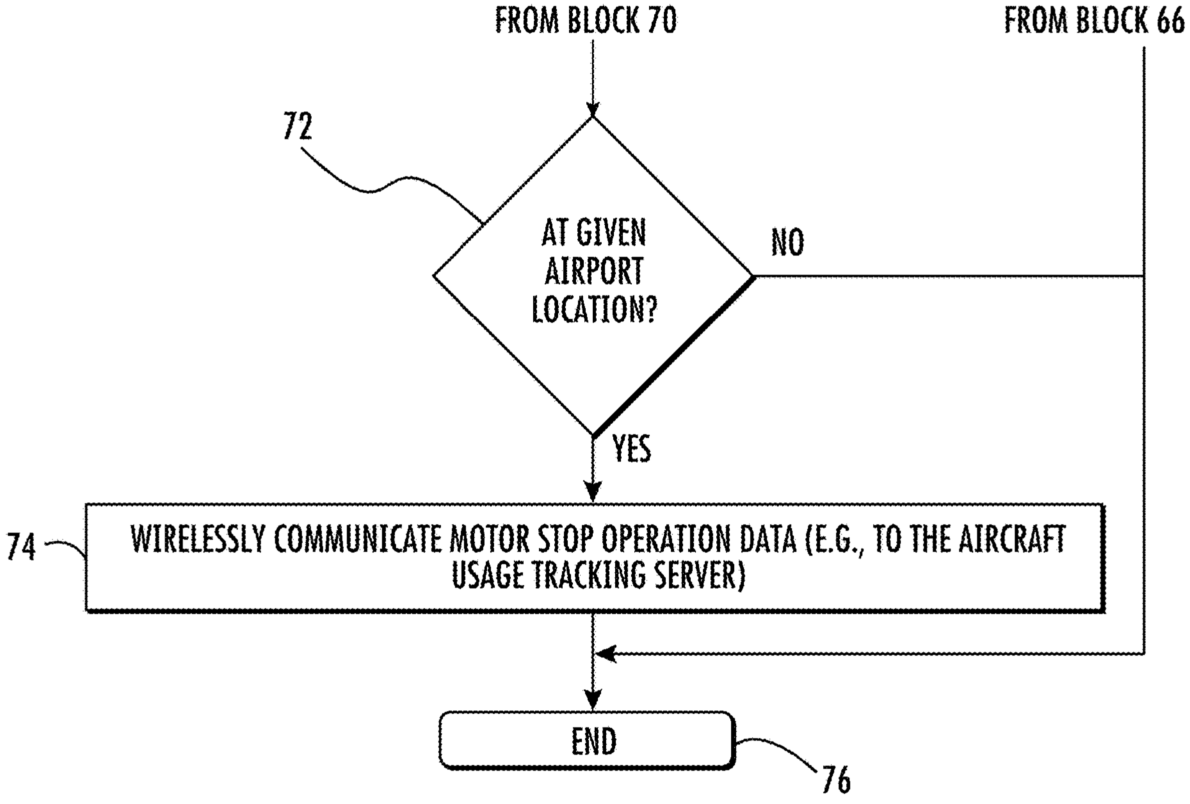

Referring now to the flowchart 60 in FIGS. 4A and 4B, beginning at Block 62, operations of the aircraft usage tracking device 40 will now be described. While operations of the aircraft usage tracking device 40 are described herein, it should be understood the operations are performed by the aircraft operation controller 43 cooperating with a memory, the wireless communications circuitry 42, and/or other inputs, outputs, or devices coupled thereto.

At Block 64, the aircraft usage tracking device 40 determines a motor start operation of the motor 31. The aircraft usage tracking device 40 may determine a motor start operation based upon the application of power to the aircraft usage tracking device 40 from the power source or supply 33 via the electrical bus 32 or input designated to sense such power. In other words, the aircraft usage tracking device 40 may consider the application of power thereto as a motor start event. The aircraft usage tracking device 40 may alternatively or additionally determine the motor start operation based upon a sensed pressure from the fluid sensor 34, for example, a sensed oil pressure indicative of operation of the engine. Other and/or additional inputs to the aircraft usage tracking device 40 may be used to determine a motor start operation, such as, for example, information obtained from avionics, a tachometer, and/or a Hobbs meter.

In some embodiments, the aircraft usage tracking device 40 may include its own power source carried by the housing 41 to provide power for operation when power from the electrical bus 32 is not provided. The aircraft usage tracking device 40 may operate in a lower power mode based upon its own power source (e.g., internal battery) until power is applied from the electrical bus 32, at which time power for operating the aircraft usage tracking device may be provided from the aircraft power source 33.

The aircraft usage tracking device 40, at Block 66, determines that the aircraft 30, and more particularly, the aircraft start operation, is at the given airport location 22. The aircraft usage tracking device 40 may determine that the aircraft start operation is at the given airport location 22 based upon communication with a paired wireless communications network. For example, during a setup process of the aircraft usage tracking device 40, the wireless communications network 21 at the given airport location 22 may be set for communications (i.e., given location network) by entering the network identifier and access credentials, for example, a password. The aircraft usage tracking device 40 may determine the motor start operation is at the given airport location 22 based upon identifying the wireless communications network 21 as being available (i.e., in communications range, for example, as identified by the network identifier) and/or by accessing the wireless communications network via the access credentials. In some embodiments, the aircraft usage tracking device 40 may not determine the motor start operation based upon the wireless communications network 21.

The aircraft usage tracking device 40 wirelessly communicates motor start operation data 50 (Block 68). The motor start operation data 50 may include a timestamp, for example, current time of day, a relative time (e.g., zero time), and/or an aircraft operation time, such as, for example, associated with a Hobbs meter or tachometer within the aircraft. In some embodiments, the aircraft usage tracking device 40 may operate or function as a Hobbs meter and/or tachometer meter based upon inputs thereto, for example, based upon electrical power applied thereto and/or sensed oil pressure.

The aircraft usage tracking device 40 may communicate the motor start operation data 50 upon the motor start operation at the given airport location 22, for example (Block 68). In other words, when the aircraft is at the given airport location 22 during the motor start operation, the motor start operation data 50 is communicated. Conversely, when the motor start operation is not at the given airport location 22 (i.e., away from the given airport location, such as, for example, at a remote airport or remote facility at the same airport), the motor start data may not be wirelessly communicated (e.g., because the aircraft and aircraft usage tracking device 40 are outside communication range 23 with the wireless communications network 21), and may be stored for future wireless communication, for example, in the memory (e.g., when the aircraft is back in communications range with the wireless communications network). In some embodiments, the aircraft usage tracking device 40 may communicate the motor start operation data 50 along with an aircraft identifier associated therewith. The aircraft identifier may include an aircraft registration number, for example, the aircraft's "N" number.

The aircraft usage tracking device 40 may wirelessly communicate the motor start operation data 50 to an aircraft usage tracking server 55, as will be described in further detail below. Moreover, as will be appreciated by those skilled in the art, while the motor start operation is illustratively described as being determined prior to determining whether the aircraft is at the given airport location 22, the motor start operation may be determined after and concurrently with determining whether the aircraft is at the given airport location.

The aircraft usage tracking device 40 determines a motor stop operation of the motor 31 (Block 70). The aircraft usage tracking device 40 may determine a motor stop operation similarly to determining a motor start operation. For example, the aircraft usage tracking device 40 may determine a motor stop operation based upon the removal of power to the aircraft usage tracking device 40 from the power source 33 via the electrical bus 32, or an input designated to sense such power. In other words, the aircraft usage tracking device 40 may consider the removal of power thereto as a motor stop event or operation. The aircraft usage tracking device 40 may alternatively or additionally determine the motor stop operation based upon a sensed pressure from the fluid sensor 34, for example, a sensed oil pressure indicative of the engine being inoperative or turned-off. Other and/or additional inputs to the aircraft usage tracking device 40 may be used to determine a motor stop operation, such as, for example, information obtained from avionics, a tachometer, and/or a Hobbs meter.

At Block 72, the aircraft usage tracking device 40 determines whether the motor stop operation is at the given airport location 22. The aircraft usage tracking device 40 may determine the aircraft 30 is at the given airport location 22 based upon communication with the wireless communications network 21, such as, for example, being within a wireless communications range 23. The aircraft usage tracking device 40 may determine the aircraft is at the given airport location 22 based upon identification as in-range (e.g., the aircraft usage tracking device) the wireless communications network 21 (e.g., based upon the wireless network identifier), and/or based upon access to the wireless communications network, for example, via the network credentials (e.g., password, via the aircraft usage tracking device).

When the motor stop operation is at the given airport location 22 (Block 72), the aircraft usage tracking device 40 wirelessly communicates the motor stop operation data 51 (Block 74). In some embodiments, the motor stop operation data 51 may be wirelessly communicated with the motor start operation data 50 when the motor stop operation is at the given airport location 22. More particularly, the aircraft usage tracking device 40 may determine whether wireless communication with the wireless communications network 21 had been lost between the determined motor start and motor stop operations (e.g., indicative of being out-of-range from the wireless communications network 21), and, based therein, wirelessly communicate the motor start and motor stop operation data 50, 51 upon reconnection to the wireless communications network. The aircraft identifier may also be communicated along with the motor stop operation data 51.

When the motor stop operation is not at the given airport location 22, the aircraft usage tracking device 40 may not wirelessly communicate the motor stop operation data 51. The aircraft usage tracking device 40 may store the motor stop operation data 51 for later or further communication, such as, for example, diagnostics or operation auditing. Operations end at Block 76.

Figure 5:
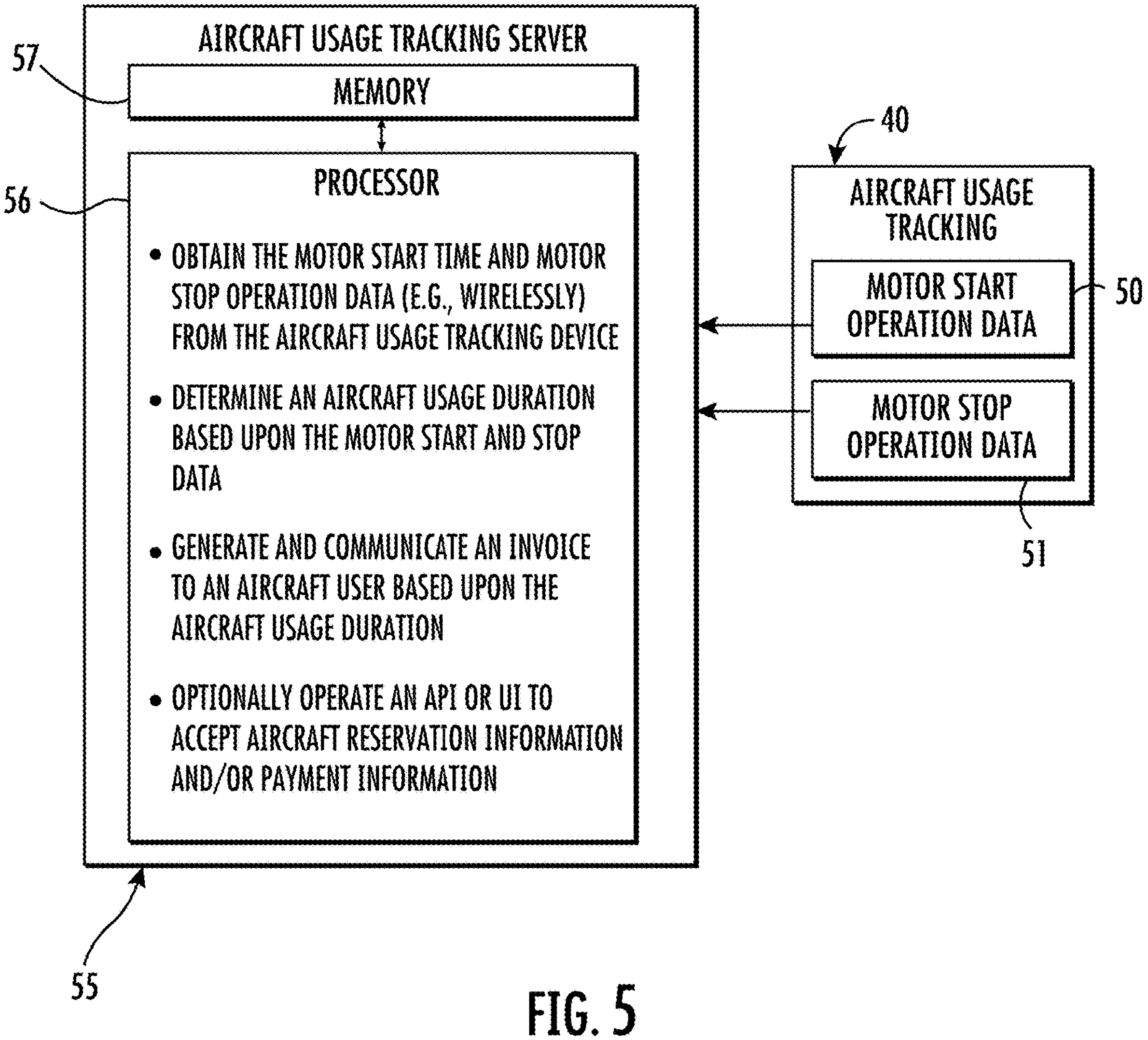
FIG. 5 is a schematic block diagram of another portion of the aircraft usage tracking system of FIG. 1.

Referring now additionally to FIG. 5, the aircraft usage tracking device 40 may communicate the motor start operation data 50 and the motor stop operation data 51 to an aircraft usage tracking server 55. The aircraft usage tracking server 55 may be at the given airport location 22 or remote from the given airport location (e.g., cloud based and/or accessible via the Internet). The aircraft usage tracking server 55 includes a processor 56 and an associated memory 57. While operations of the aircraft usage tracking server 55 are described herein, those skilled in the art will appreciate that the operations are performed based upon cooperation between the processor 56 and the memory 57.

In some embodiments, the aircraft usage tracking server 55 may obtain the motor start operation and motor stop operation data 50, 51, for example, wirelessly, from the aircraft usage tracking device 40 (e.g., instead of the aircraft usage tracking device sending the motor start and motor stop operation data). The aircraft usage tracking server 55 determines an aircraft usage duration based upon the motor start and stop operation data 50, 51. More particularly, the aircraft usage tracking server 55 may calculate the motor operation in terms of time similarly to a Hobbs meter. The aircraft usage tracking server 55 may generate and communicate an invoice 58 (e.g., based upon an aircraft rental or usage rate) to a remote device 45, such as, for example, associated with a renter, student, or pilot, based upon the aircraft usage duration. The aircraft usage tracking server 55 may operate an application programming interface (API) or user interface (UI) to accept aircraft reservation information and/or payment information, which in turn may be communicated to a payment processing system for processing (e.g., payment card processing).

Figure 6:
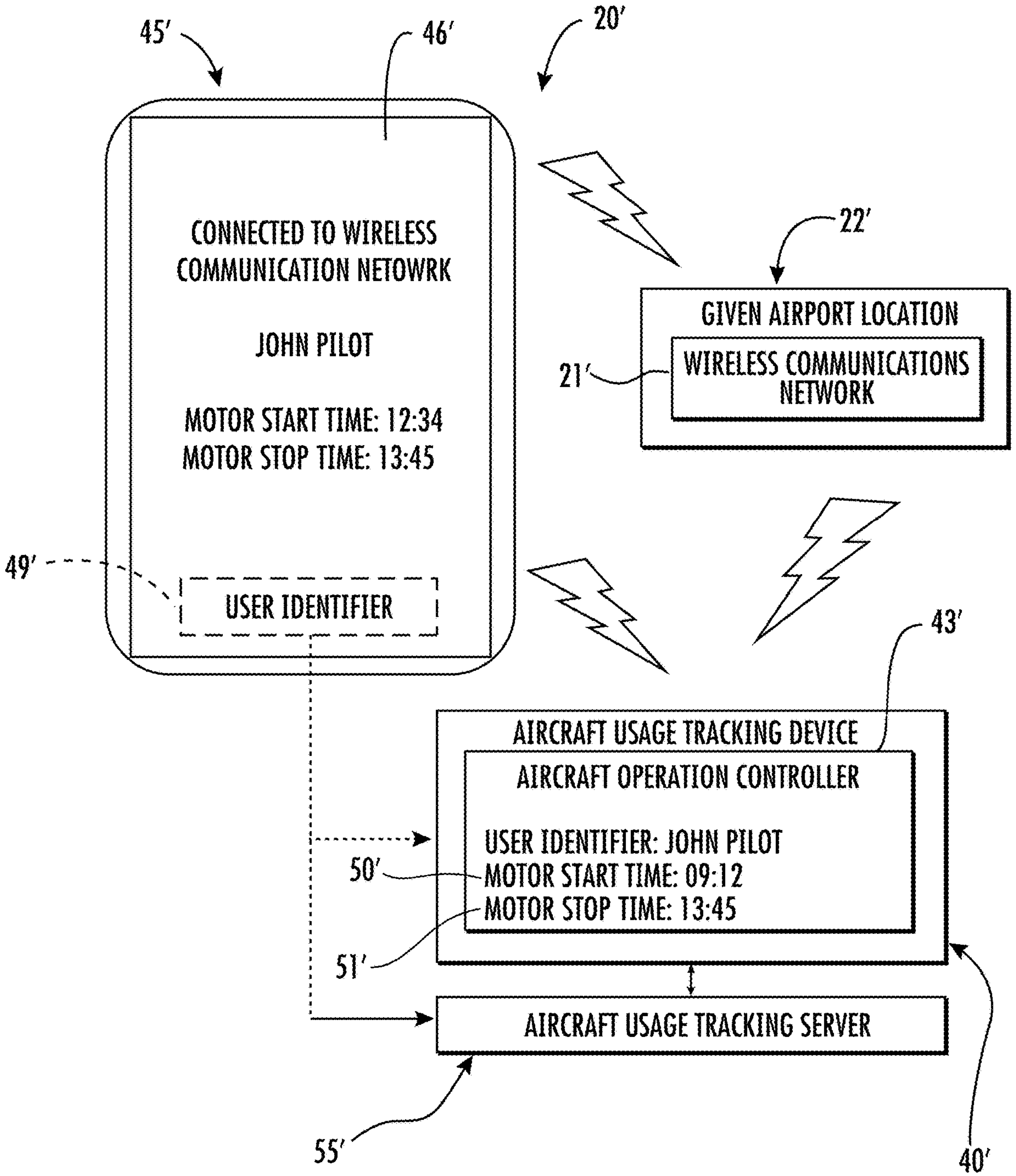
FIG. 6 is a schematic diagram of a portion of an aircraft usage tracking system in accordance with another embodiment.

Referring now to FIG. 6, in another embodiment, the aircraft usage tracking system 20' includes a user interface device 45' associated with a given user. The user interface device 45' is illustratively in the form of a tablet computer. The user interface device 45' may be in the form of a mobile wireless communications device, such as, for example, a mobile or smart phone, tablet computer, laptop computer, or wearable device.

The aircraft operation controller 43' or aircraft usage tracking device 40' determines whether the motor stop operation of the motor is at the given airport location based upon connection (or re-connection) of the user interface device 45' to the wireless communications network 21', and when so, wirelessly communicate the motor stop operation data 51'. In other words, in an embodiment, the in-range connection for purposes of determining whether the aircraft is at the given airport location 22', may be between the user interface device 45' and the wireless communications network 21'. The in-range connection (and reconnection) may be determined based upon communication between the aircraft usage tracking device 40' and the wireless communications network 21', and, optionally, additionally, an in-range connection between the user interface device 45' and the wireless communications network. The aircraft usage tracking device 40' may determine the motor stop operation based upon both the in-range reconnection (e.g., after a determined disconnection) to the wireless network 21' and the user interface device 45' also connecting to the wireless network.

The user interface device 45' may display, on its display 46' information from the aircraft usage tracking device 40', including, for example, motor start and motor stop operation data 50', 51'. Of course, the user interface device 45' may display other and/or additional information, for example, via a flight application and/or communication with avionics on the aircraft (e.g., navigation, communication, and/or motor monitoring systems).

The user interface device 45' may have a user identifier 49' associated therewith (e.g., name, username, email address, etc.). The user interface device 45' may wirelessly communicate the user identifier 49', for example, to the aircraft usage tracking server 55', for association with a given user for billing or other tracking purposes, as will be appreciated by those skilled in the art. Additionally, when an aircraft scheduling application is operated, the aircraft usage tracking server 55' may compare the user identifier 49' to user contact information associated with the aircraft reservation for determining or verifying the user for billing purposes. For example, John Pilot is scheduled to fly a given aircraft on a given day between 9 am and 11 am, and the aircraft usage tracking server 55' obtains the user identifier 49' around 9 am along with the aircraft identifier, the server may determine or verify the user based upon comparison to the reservation details. The receipt of the user identifier 49' and the aircraft identifier within a threshold time of a reservation may check-out and/or check-in the aircraft in the scheduling application, for example, as will be appreciated by those skilled in the art.

Figure 7:
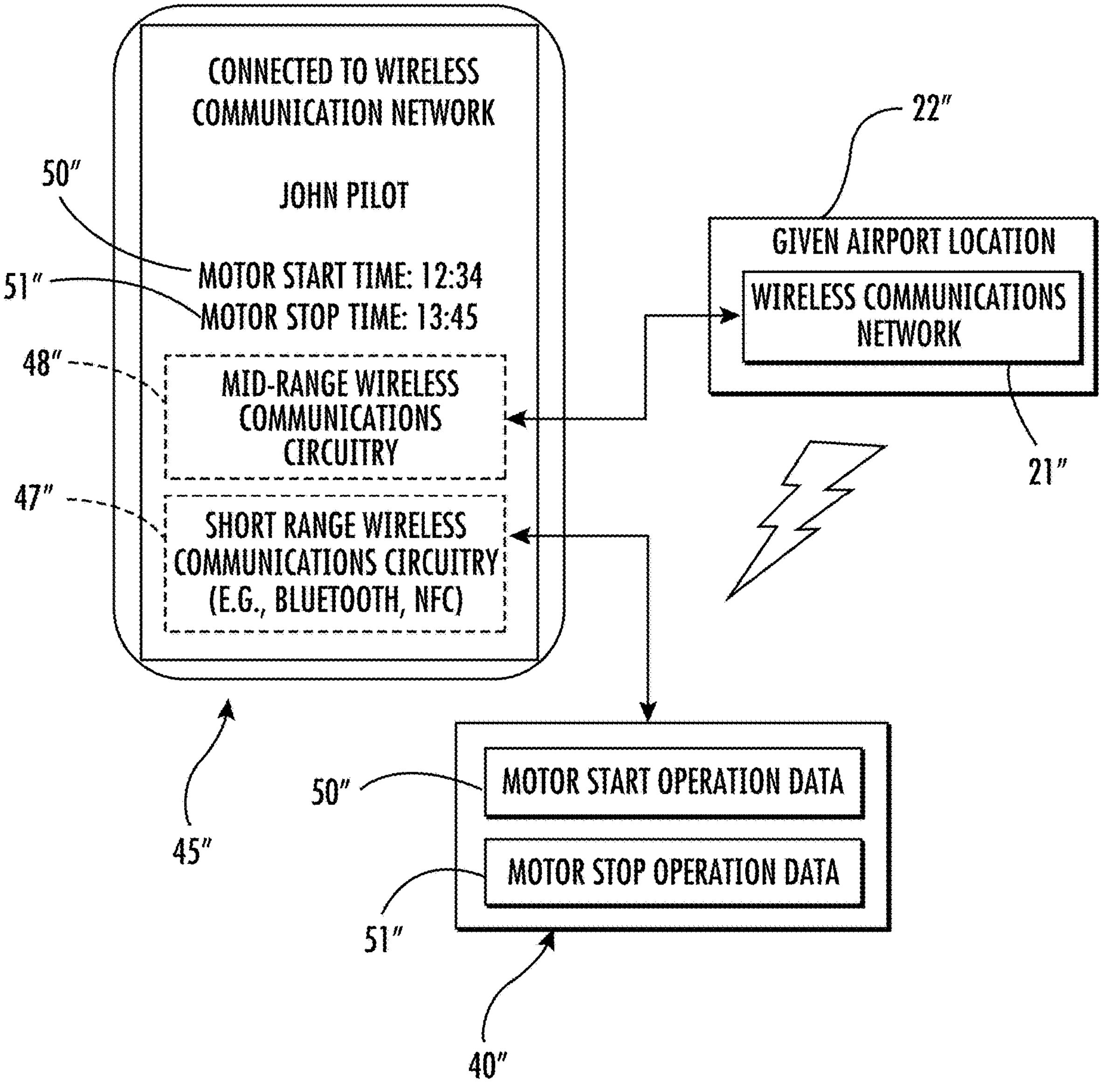
FIG. 7 is a schematic diagram of a portion of an aircraft usage tracking system in accordance with another embodiment.

Referring now to FIG. 7, in another embodiment, the user interface device 45" includes short-range wireless communications circuitry 47", for example, to provide a Bluetooth or other short-range wireless communications protocol wireless connection to the wireless communications circuitry of the aircraft usage tracking device 40". The user interface device 45" also includes mid-range wireless communications circuitry 48", for example, to provide a WiFi protocol connection to the wireless communications network 21" at the given airport location 22". The motor start and stop operation data 50", 51" may be communicated via the user interface device 45", and the determination of whether the motor stop operation (or the given aircraft) is at the given airport location, while being made by the aircraft usage tracking device 40", may be based upon re-connection to the wireless communications network 21" via the user interface device. The user interface device 45" may also include long-range wireless communications circuitry, for example, cellular or satellite communications circuitry.

Figure 8:
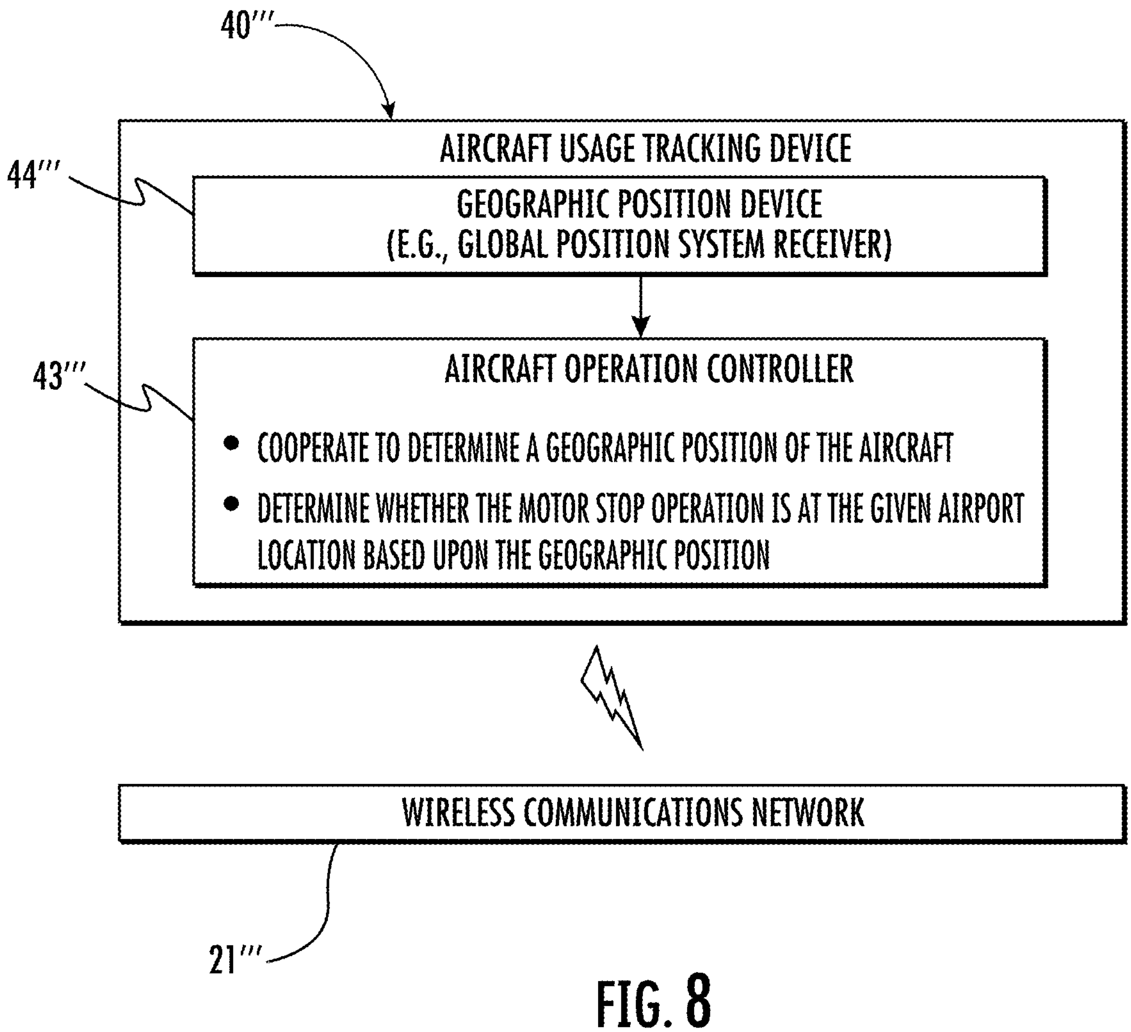
FIG. 8 is a schematic diagram of a portion of an aircraft usage tracking system in accordance with another embodiment.

Referring now to FIG. 8, in another embodiment, the aircraft usage tracking device 40''' includes a geographic position device 44''', for example, a global positioning system (GPS) receiver, that is coupled to the aircraft operation controller 43'''. The aircraft operation controller 43''' and the geographic position device 44''' cooperate to determine a geographic position of the aircraft. The aircraft operation controller 43''' determines whether the motor stop operation is at the given airport location based upon the geographic position of the aircraft at the given airport location. In other words, the aircraft operation controller 43''' may determine the motor stop operation is at the given airport location based upon both re-connection to the wireless communications network 21''' (e.g., via the aircraft usage device wireless communications circuitry and/or the wireless communications circuitry of the user interface device) and the geographic position being within a threshold distance or relatively close to the given airport location. The threshold distance may be determined based upon current geographic coordinates of the aircraft usage tracking device 40''' relative to geographic coordinates associated with the given airport location. In other words, the use of geographic position may provide more accurate determinations of whether the motor stop operation is at the given airport location (i.e., the same location as the motor start operation). This may be particularly advantageous, if, for example, there are two different spaced apart wireless networks at two different physical locations, which may be at the same airport, but having a same network identifier (SSID). Other geo-reference data elements may be used to determine that the motor stop operation is at the given airport location, for example, altitude, and/or automatic dependent surveillance-broadcast (ADS-B) data. The geographic position data and/or the other geo-reference data elements may be provided, in some embodiments, from the user interface device and/or the aircraft itself (e.g., ADS-B outputs, avionics, and/or bus data).

The embodiments of the aircraft usage tracking system 20 described herein may be particularly advantageous for more accurately tracking usage of aircraft. For example, the aircraft usage tracking system 20 may be particularly advantageous in a flight school or aircraft rental operation where rental times are measured by aircraft usage times. Renters and/or students may inject errors in reporting start and stop times, which, unless caught early, may carry the error forward. These errors may cause inefficiencies since they would typically manually be adjusted when the error is identified, and any billing or invoicing from the error onward would also have to be adjusted. Still further, manually tracking usage times may be more susceptible to fraud. For example, a student or renter may purposely enter wrong usage, and unless a physical person verifies the usage times, once the invoice is generated, there may be no recourse for the aircraft owner. The present aircraft usage system 20 may address these issues by removing the renter or student from the inputting the usage times. Accordingly, the aircraft usage system 20 may thus increase efficiencies and provide may accurate aircraft usage reporting.

A method aspect is directed to a method of tracking aircraft usage for an aircraft 30 having at least one motor 31. The method includes using an aircraft usage tracking device 40 to determine a motor start operation of the at least one motor 31 when the aircraft 30 is at a given airport location 22 based upon connection to a wireless communications network 21 at the given airport location. The method also includes using the aircraft usage tracking device 40 to wirelessly communicate motor start operation data 50 associated with the motor start operation, and determine a motor stop operation of the at least one motor 31. The method also includes using the aircraft usage tracking device 40 to determine whether the motor stop operation of the at least one motor 31 is at the given airport location 22 based upon a reconnection to a wireless communications network 21 at the given airport location, and when so, wirelessly communicate motor stop time operation data 51 associated with the motor stop operation.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An aircraft usage tracking system comprising:

a wireless communications network at a given airport location; and an aircraft usage tracking device carried by an aircraft having at least one motor, the aircraft usage tracking device comprising wireless communications circuitry, and an aircraft operation controller coupled to the wireless communications circuitry and configured to determine a motor start operation of the at least one motor when the aircraft is at the given airport location based upon connection to the wireless communications network, wirelessly communicate motor start operation data associated with the motor start operation, determine a motor stop operation of the at least one motor, and determine whether the motor stop operation of the at least one motor is at the given airport location based upon a reconnection to the wireless communications network, and when so, wirelessly communicate motor stop operation data associated with the motor stop operation.

2. The aircraft usage tracking system of claim 1 wherein the aircraft operation controller is configured to wirelessly communicate the motor start operation data based upon the motor start operation at the given airport location.

3. The aircraft usage tracking system of claim 1 wherein the aircraft operation controller is configured to wirelessly communicate the motor start operation data based upon the motor stop operation being at the given airport location.

4. The aircraft usage tracking system of claim 3 wherein the aircraft operation controller is configured to wirelessly communicate the motor stop operation data based upon a disconnection from the wireless communications network between the motor start and motor stop operations.

5. The aircraft usage tracking system of claim 1 further comprising an aircraft usage tracking server; and wherein the aircraft operation controller is configured to wirelessly communicate the motor start and stop operation data to the aircraft usage tracking server.

6. The aircraft usage tracking system of claim 5 wherein the aircraft usage tracking server is configured to determine an aircraft usage duration based upon the motor start and stop operation data.

7. The aircraft usage tracking system of claim 6 wherein the aircraft usage tracking server is configured to generate and communicate an invoice to an aircraft user based upon the aircraft usage duration.

8. The aircraft usage tracking system of claim 1 further comprising a user interface device associated with a given user; and wherein the aircraft operation controller is configured to determine whether the motor stop operation of the at least one motor is at the given airport location based upon connection of the user interface device to the wireless communications network, and when so, wirelessly communicate the motor stop operation data.

9. The aircraft usage tracking system of claim 1 wherein the motor start operation data comprises at least one of a motor start time, a motor tachometer start time, and a motor Hobbs meter start time; and wherein the motor stop operation data comprises at least one of a motor stop time, a motor tachometer stop time, and a motor Hobbs meter stop time.

10. The aircraft usage tracking system of claim 1 wherein the aircraft comprises an electrical bus coupled to the aircraft operation controller; and wherein the aircraft operation controller is configured to determine the motor start operation based upon a voltage on the electrical bus, and determine the motor stop operation based upon removal of the voltage on the electrical bus.

11. The aircraft usage tracking system of claim 1 wherein the at least one motor comprises at least one combustion engine; wherein the aircraft comprises at least one fluid pressure sensor associated with the at least one combustion engine and coupled to the aircraft operation controller; and wherein the aircraft operation controller is configured to determine the motor start operation based upon a sensed pressure from the fluid pressure sensor.

12. The aircraft usage tracking system of claim 1 wherein the aircraft usage tracking device further comprises a geographic position determining device coupled to the aircraft operation controller and configured to determine a geographic position of the aircraft; and wherein the aircraft operation controller is configured to determine whether the motor stop operation of the at least one motor is at the given airport location based upon the geographic position of the aircraft at the given airport location.

13. An aircraft usage tracking device for an aircraft having at least one motor, the aircraft tracking device comprising:

wireless communications circuitry; and an aircraft operation controller coupled to the wireless communications circuitry and configured to determine a motor start operation of the at least one motor when the aircraft is at a given airport location based upon connection to a wireless communications network at the given airport location, wirelessly communicate motor start operation data associated with the motor start operation, determine a motor stop operation of the at least one motor, and determine whether the motor stop operation of the at least one motor is at the given airport location based upon a reconnection to the wireless communications network at the given airport location, and when so, wirelessly communicate motor stop operation data associated with the motor stop operation.

14. The aircraft usage tracking device of claim 13 wherein the aircraft operation controller is configured to wirelessly communicate the motor start operation data based upon the motor start operation at the given airport location.

15. The aircraft usage tracking device of claim 13 wherein the aircraft operation controller is configured to wirelessly communicate the motor start operation data based upon the motor stop operation being at the given airport location.

16. The aircraft usage tracking device of claim 13 wherein the aircraft comprises an electrical bus coupled to the aircraft operation controller; and wherein the aircraft operation controller is configured to determine the motor start operation based upon a voltage on the electrical bus, and determine the motor stop operation based upon removal of the voltage on the electrical bus.

17. The aircraft usage tracking device of claim 13 wherein the at least one motor comprises at least one combustion engine; wherein the aircraft comprises at least one fluid pressure sensor associated with the at least one combustion engine and coupled to the aircraft operation controller; and wherein the aircraft operation controller is configured to determine the motor start operation based upon a sensed pressure from the fluid pressure sensor.

18. The aircraft usage tracking device of claim 13 further comprising a geographic position determining device coupled to the aircraft operation controller and configured to determine a geographic position of the aircraft; and wherein the aircraft operation controller is configured to determine whether the motor stop operation of the at least one motor is at the given airport location based upon the geographic position of the aircraft at the given airport location.

19. A method of tracking aircraft usage for an aircraft having at least one motor, the method comprising:

using an aircraft usage tracking device to determine a motor start operation of the at least one motor when the aircraft is at a given airport location based upon connection to a wireless communications network at the given airport location, wirelessly communicate motor start operation data associated with the motor start operation, determine a motor stop operation of the at least one motor, and determine whether the motor stop operation of the at least one motor is at the given airport location based upon a reconnection to a wireless communications network at the given airport location, and when so, wirelessly communicate motor stop operation data associated with the motor stop operation.

20. The method of claim 19 wherein using the aircraft usage tracking device comprises using the aircraft usage tracking device to wirelessly communicate the motor start operation data based upon the motor start operation at the given airport location.

21. The method of claim 19 wherein using the aircraft usage tracking device comprises using the aircraft usage tracking device to wirelessly communicate the motor start operation data based upon the motor stop operation being at the given airport location.

22. The method of claim 19 wherein the aircraft comprises an electrical bus coupled to the aircraft operation controller; and wherein using the aircraft usage tracking device comprises using the aircraft usage tracking device to determine the motor start operation based upon a voltage on the electrical bus, and determine the motor stop operation based upon removal of the voltage on the electrical bus.

23. The method of claim 19 wherein the at least one motor comprises at least one combustion engine; wherein the aircraft comprises at least one fluid pressure sensor associated with the at least one combustion engine and coupled to the aircraft operation controller; and wherein using the aircraft usage tracking device comprises using the aircraft usage tracking device to determine the motor start operation based upon a sensed pressure from the fluid pressure sensor.

24. The method of claim 19 wherein using the aircraft usage tracking device further comprises using the aircraft usage tracking device to determine a geographic position of the aircraft based upon a geographic position determining device, and determine whether the motor stop operation of the at least one motor is at the given airport location based upon the geographic position of the aircraft at the given airport location.

* * * * *